Aug. 19, 1958          T. GEORGI          2,848,245
STEERABLE AXLE ARRANGEMENT FOR MOTOR VEHICLE TRAILERS
Filed May 16, 1956          3 Sheets-Sheet 1
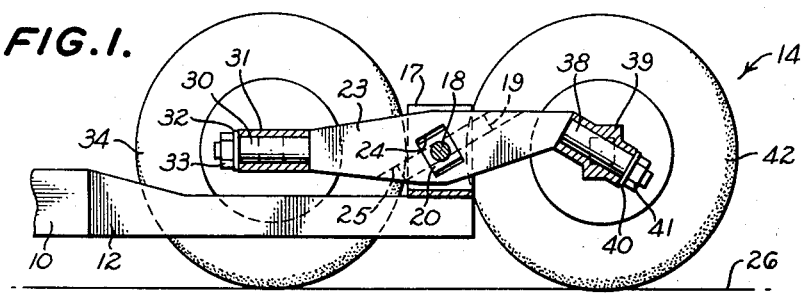
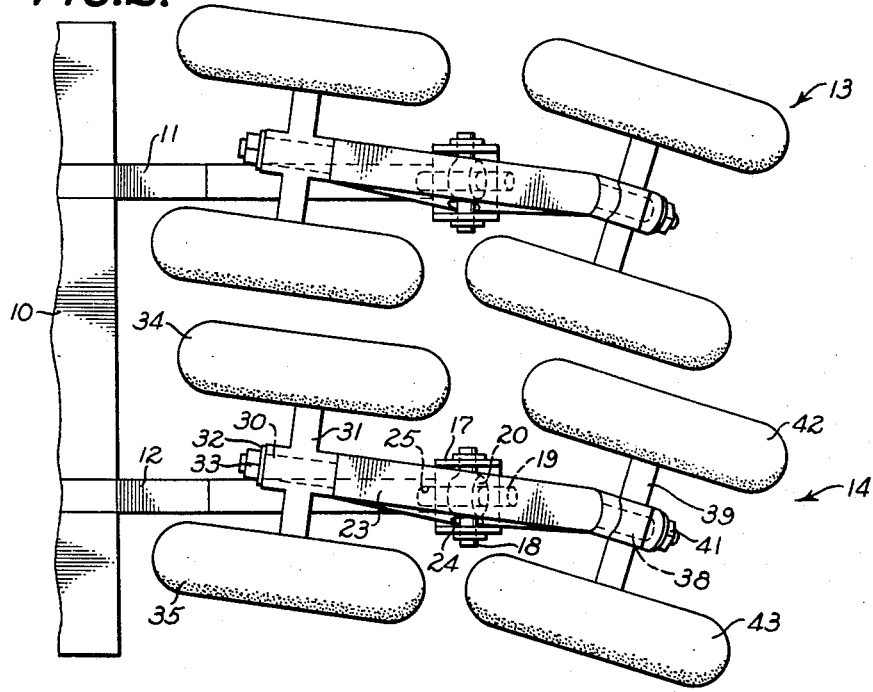
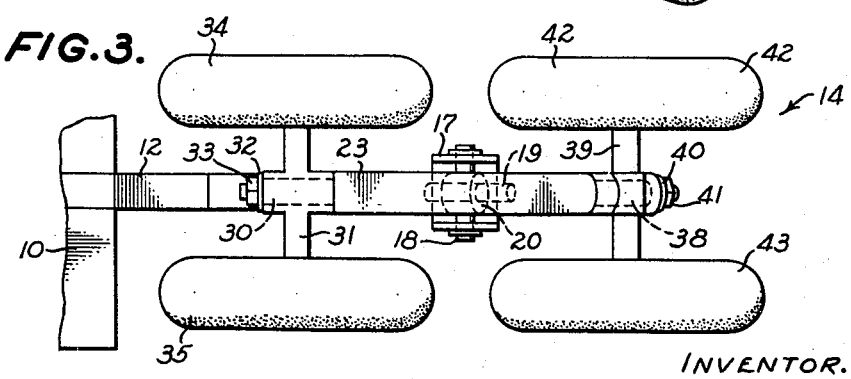
INVENTOR.
THEODOR GEORGI
BY HIS ATTORNEYS.
HARRIS, KIECH, FOSTER & HARRIS Aug. 19, 1958 T. GEORGI 2,848,245
STEERABLE AXLE ARRANGEMENT FOR MOTOR VEHICLE TRAILERS
Filed May 16, 1956 3 Sheets-Sheet 2

INVENTOR.
THEODOR GEORGI

BY HIS ATTORNEYS.
HARRIS, KIECH, FOSTER & HARRIS

Aug. 19, 1958  T. GEORGI  2,848,245
STEERABLE AXLE ARRANGEMENT FOR MOTOR VEHICLE TRAILERS
Filed May 16, 1956  3 Sheets-Sheet 3

INVENTOR.
THEODOR GEORGI

BY HIS ATTORNEYS.
HARRIS, KIECH, FOSTER & HARRIS

United States Patent Office 2,848,245
Patented Aug. 19, 1958

2,848,245

STEERABLE AXLE ARRANGEMENT FOR MOTOR VEHICLE TRAILERS

Theodor Georgi, Hilden, Germany, assignor to American European Engineering Corporation, Santa Barbara, Calif., a corporation of California Application May 16, 1956, Serial No. 585,321

Claims priority, application Germany August 26, 1955

9 Claims. (Cl. 280—81)

This invention relates to trailers adapted for use with motor vehicles or the like and in particular to automatic steering devices for vehicular trailers.

When the operator of a conventional tractor and trailer combination is negotiating a turn, the vehicle must be steered along a path different from that used with a typical passenger automobile. This difference in steering paths is required because the rear wheels of the long tractor-trailer combination do not follow the paths of the front wheels but deviate considerably therefrom. Because of such deviation, the turns which may be negotiated by the long vehicles must be less sharp than those which are maneuverable by a shorter vehicle. Such disadvantages have been overcome in the construction of long fire-fighting equipment where the rear wheels of the vehicle are independently and manually steered.

It is an object of this invention to provide a device for automatically steering the rear axle of a long vehicle such as a trailer so that the rear wheels will follow substantially the same path as the forward wheels.

It is another object of the invention to provide a device for automatically steering one or more of the rear axles of a long vehicle such as a trailer having dual rear axles so that the rear wheels will follow substantially the same path as the forward wheels.

It is a further object of the invention to provide a steerable axle arrangement for a trailer or the like in which an axle is rotatably carried on a bearing shaft, the axis of rotation about the bearing shaft being oblique to the surface on which the vehicle travels and the bearing shaft being part of an axle support bar which is pivotally mounted on the frame of the vehicle so that the axle is rotated relative to the oblique bearing shaft when the axle support bar is rotated relative to the frame of the vehicle.

It is another object of the invention to provide a steerable axle arrangement for a trailer or the like in which an axle is mounted on an axle support bar and is rotatable relative thereto about an oblique axis and in which the axle support bar is carried on the frame of the vehicle by means of a cross joint structure which is also positioned at an oblique angle.

It is a further object of the invention to provide a steerable axle arrangement for a trailer or the like in which an axle is rotatably carried on an oblique bearing shaft of an axle support bar with a rotatable bearing block being positioned between the axle and the oblique shaft and in which the axle support bar is pivotally mounted on the frame of the vehicle and the bearing block is pivotally coupled to the frame of the vehicle so that when the axle support bar is pivoted in a horizontal plane relative to the frame the axle also will be pivoted in a horizontal plane relative to the axle support bar.

The invention also comprises novel details of construction and novel combinations and arrangements of parts, which will more fully appear in the course of the following description. The drawings merely show and the description merely describes preferred embodiments of the present invention which are given by way of illustration or example.

In the drawings, which are diagrammatic representations of the invention:

Fig. 1 is a vertical sectional view of a preferred embodiment of the invention;

Fig. 2 is a top view of the embodiment of Fig. 1, showing the vehicle negotiating a turn;

Fig. 3 is a top view of a portion of the embodiment of Fig. 1, showing the vehicle traveling along a straight line;

Figure 4:
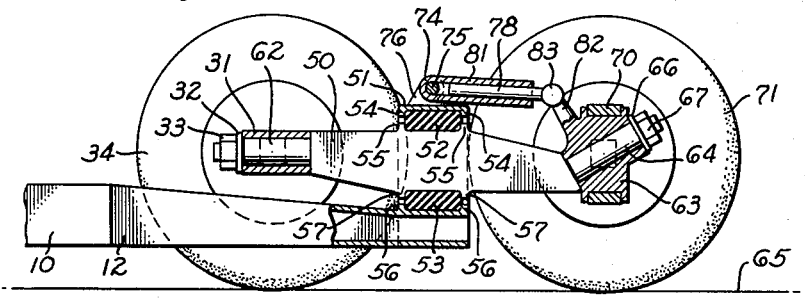
Fig. 4 is a vertical sectional view of an alternative embodiment of the invention.

In Figs. 1, 2 and 3, a preferred embodiment of the invention is shown being used to support the rear end of a heavy duty low bed trailer 10 having parallel rearwardly extending frame members 11 and 12. Steering units 13 and 14 are mounted at the ends of the frame members 11 and 12 respectively, the two steering units being identical so that only one will be described in detail.

The steering unit 14 includes a U-shaped bracket 17 rigidly fixed to the frame member 12 with the open end of the U facing upward. A pin 18 is pivotally mounted between the upstanding arms of the U bracket 17, the pivot axis of the pin being horizontal and transverse to the longitudinal axis of the trailer 10. A second pin 19 is fixed in an enlarged central portion 20 of the pin 18, the axes of the two pins intersecting at right angles. An axle support bar 23 is positioned between the upstanding arms of the U bracket 17 and has intersecting openings 24 and 25 therein. The opening 25 lies in a plane parallel to the longitudinal axis of the trailer 10 and the axis of the opening intersects the surface 26 of the roadway at an oblique angle, the opening serving as a bearing bore for the pin 19 so that the axle support bar 23 may rotate about the pin 19. The opening 24 passes through the axle support bar 23 transverse to the longitudinal axis of the trailer so that the pin 18 may be positioned within the opening, the support bar 23 rotating about the pin 19 and both the support bar and the pin 19 rotating about the pin 18.

The forward end of the axle support bar 23 is formed as a cylindrical shaft 30 over which an axle 31 is rotatably mounted, the axle being maintained in position by a washer 32 and nut 33. Wheels 34, 35 are mounted at each end respectively of the axle 31.

A shaft 38, similar to the shaft 30, is formed on the axle support bar 23 opposite the shaft 30, the axis of the shaft 38 being oblique to the surface 26 of the roadway. An axle 39 is rotatably mounted on the shaft 38 by means of a washer 40 and nut 41, wheels 42 and 43 being carried at each end respectively of the axle 39.

When the trailer is moving along a straight path, the axles 31 and 39 are parallel with each other and are perpendicular to the axle support bar 23 which is aligned with the direction of travel of the vehicle, as seen in Fig. 3. When the vehicle is making a turn to the left, the trailer will move counterclockwise as shown in Fig. 2, producing a rotation of the axle support bar 23 about the pin 19. The counterclockwise movement of the trailer 10 changes the angle of intersection of the axles 31 and 39 with the longitudinal axis of the trailer and the rotation of the axle support bar 23 further changes the angle of intersection of the axle 39 with the longitudinal axis of the trailer, thus producing the desired steering for the rear end of the vehicle so that the rear wheels thereof will follow substantially the same path as the forward wheels and negotiate a turn without scuffing or sidewise dragging of the wheels. Thus it is seen that the coupling structure comprising the pins 18 and 19, which are pivotally mounted relative to the frame members and the axle support bar and which may be referred to as a cross joint, serve to control the angle which the shaft 38 makes with the roadway and thereby defines the plane of rotation of the axle 39.

The relative amounts of rotation of the various elements while making a turn may be controlled by changing the angles of the oblique pin 19 and/or the oblique shaft 38 with the roadway. The operation of the steering arrangement would be the same if the forward shaft 30 rather than the rear shaft 38 were made oblique and the unit could also be operated with both shafts making oblique angles with the roadway.

In Fig. 2, two steering units 13, 14 are illustrated, the second unit being used to increase the load carrying capacity of the trailer and to eliminate rolling of the bed of the trailer so that the described steering action will take place. However, it should be noted that the steering arrangement could be operated with only one such unit present if roll stability is provided by other means. Furthermore, a single steering unit, such as the unit 14, could be operated with only a single axle 39 if suitable means were provided to support the forward end of the axle support bar above the frame or above the roadway.

Figure 5:
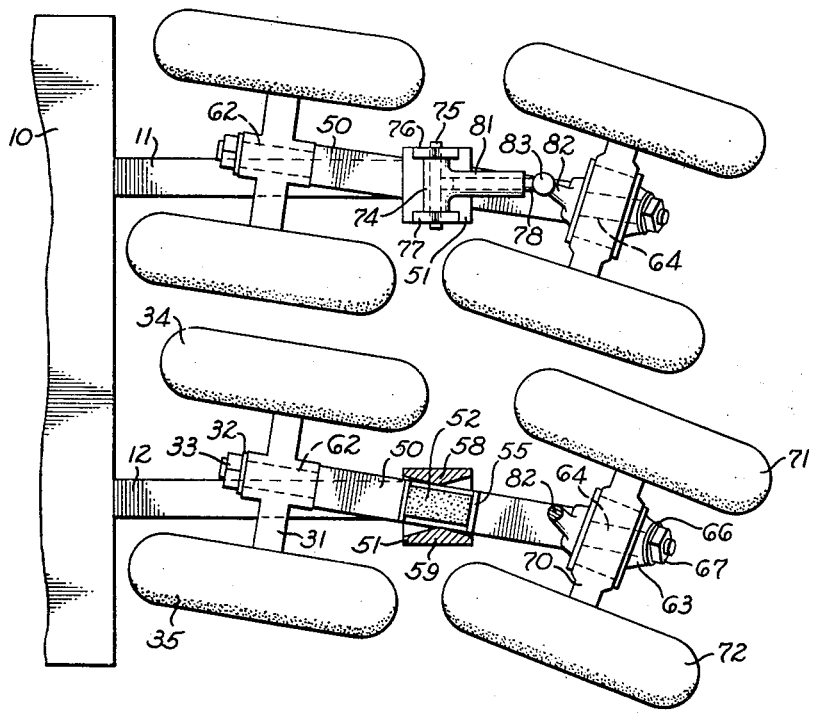
Fig. 5 is a top view of the embodiment of Fig. 4, shown partially in section.

An alternative form of the invention is shown in Figs. 4 and 5 wherein a portion of the coupling which controls the relative positions of the axle carried on the oblique shaft, and the frame of the trailer is positioned on the oblique shaft intermediate the axle and the shaft. Those elements of the embodiment of Figs. 4 and 5 which are identical to the elements of the embodiment of Figs. 1, 2 and 3 are identified by the same numerals. An axle support bar 50 is mounted in a housing 51 carried at the rear end of the frame member 12, the axle support bar being pivotal in a horizontal plane relative to the housing. The central portion of the axle support bar is positioned within the housing 51 between upper and lower cushions 52, 53, which may be of rubber or the like, the upper cushion being retained between downward extending flanges 54 of the housing 51 and upward extending ridges 55 on the axle support bar 50, the lower cushion 53 being retained between upward extending flanges 56 of the housing and downward extending ridges 57 on the axle support bar. The rotation of the axle support bar 50 is limited by engagement with wedge-shaped sides 58 and 59 on the housing 51.

The axle 31 is rotatably positioned on a horizontally extending shaft 62 formed at one end of the axle support bar 50, the axle being held in place by the washer 32 and nut 33. A bearing block 63 is rotatably mounted on a shaft 64, the axis of rotation about the shaft being oblique to the surface 65 of the roadway on which the vehicle travels. A washer 66 and nut 67 serve to retain the bearing block in position on the oblique shaft. An axle 70 is rotatably mounted on the bearing block 63 and wheels 71, 72 are carried at each end respectively of the axle. The axle 70 is rotated about the oblique shaft 64 as a function of the rotation of the trailer 10 with respect to the axle support bar 50 by means of a coupling comprising the bearing block 63, a T-shaped bar 74 pivotally mounted on a pin 75 fixed between upstanding lugs 76, 77 mounted on the top of the housing 51, a rod 78 telescopingly positioned within the leg 81 of the bar 74 and a crank arm 82 integrally formed with the bearing block 63 which is articulatedly coupled to the rod 78 at a joint 83.

When the vehicle is negotiating a turn to the left, as shown in Fig. 5, the frame members 11 and 12 move counterclockwise relative to the axle support bar 50, resulting in a clockwise rotation of the bearing block 63 about the oblique shaft 64, as viewed from the nut end of the shaft. The rotation of the bearing block on the oblique shaft changes the plane of rotation of the axle 70 relative to the axle support bar 50, thereby producing the desired steering action which enables the rear wheels of the trailer to substantially follow the same path as the front wheels. The axle 70 preferably is positioned on the bearing block so as to rotate in a vertical plane, however this plane of rotation may be varied to suit the particular application of the steering arrangement since the relative movement of the various elements is a function of the oblique angles and the lengths of the lever arms utilized.

The cross joint described in conjunction with Figs. 1, 2 and 3 may be substituted for the cushions and wedge-shaped sides in the embodiment of Figs. 4 and 5, the axis of the pin 19 being made vertical instead of oblique.

Figure 6:
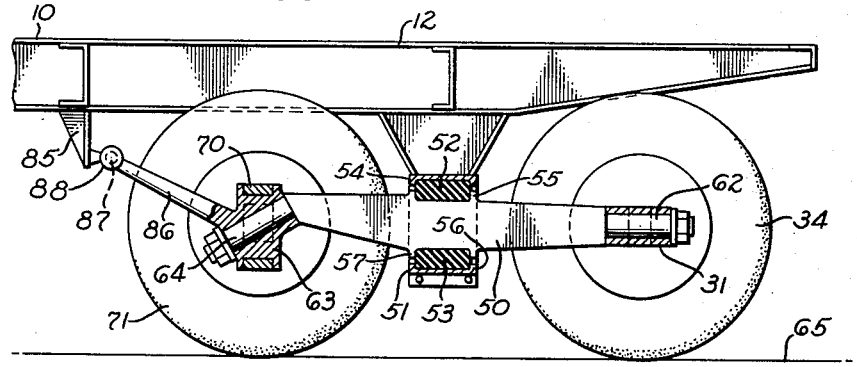
Fig. 6 is a vertical sectional view of a second alternative embodiment of the invention.
Figure 7:
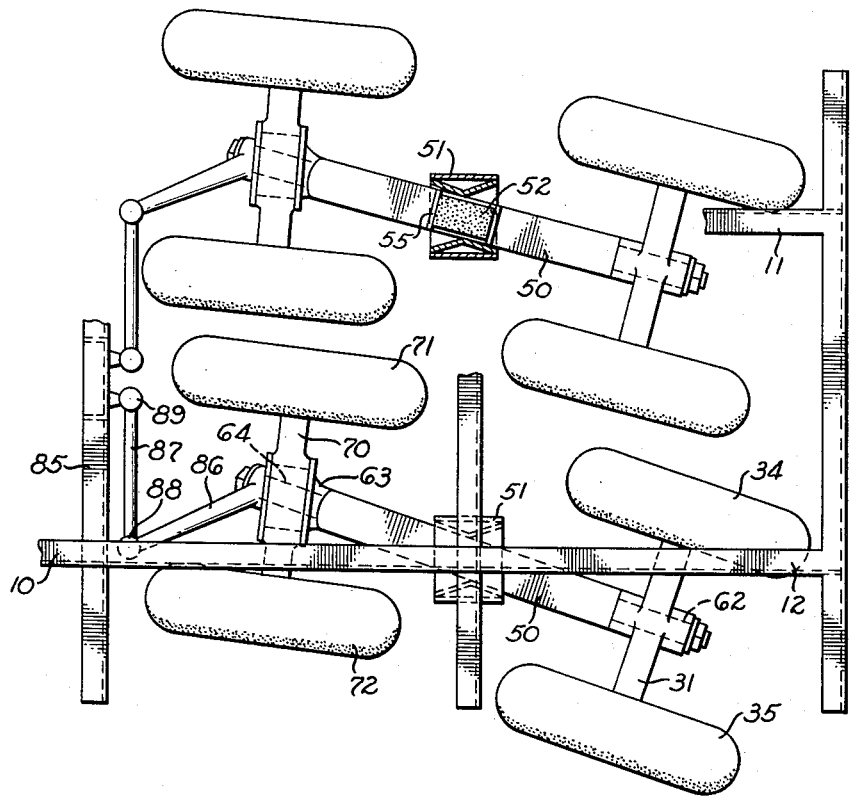
Fig. 7 is a top view of the embodiment of Fig. 6, shown partially in section.

An embodiment of the invention which is especially suitable for use with high bed trailers is shown in Figs. 6 and 7, wherein elements which are identical to those shown and described in conjunction with earlier embodiments are identified by the same numerals. The bearing block 63 which rotates on the oblique shaft 64 to vary the relation of the axle 70 with the axle support bar 50 when the trailer 10 is moved with respect to the axle support bar, is coupled to a frame member 85 via a crank arm 86 which is integrally formed with the bearing block and a link 87 which is articulatedly coupled to the crank arm at a joint 88 and to the frame member 85 at a joint 89. The operation of the embodiment disclosed in Figs. 6 and 7 is similar to that described in conjunction with the previous embodiments. It is noted that whereas in the embodiment of Fig. 5, the angle between the axle 70 and the frame member 12 is greater than the angle between the axle 31 and the frame 12, in the embodiment of Fig. 7, the angle between the axle 70 and the frame member 12 is less than the angle between the axle 31 and the frame member 12.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a steerable axle arrangement for a vehicle movable along a roadway, the combination of: an axle support pivotally mounted on the frame of the vehicle, said axle support having forward and rearward extending ends; first bearing means mounted on said axle support adjacent one of said ends, the axis of rotation about said first bearing means being oblique to the roadway; a bearing block rotatably mounted on said first bearing means, said bearing block having a crank arm displaced radially from the axis of rotation thereof; an axle assembly rotatably mounted on said bearing block, the plane of rotation of said axle assembly intersecting the plane of rotation of said bearing block; a control linkage coupling said crank arm to the frame for rotating said bearing block on said bearing means when said axle support is pivoted relative to the frame; and second bearing means mounted on said axle support adjacent the other of said ends for positioning said other end above the roadway.

2. In a steerable axle arrangement for a vehicle movable along a roadway, the combination of: an axle support mounted on the frame of the vehicle and pivotal about a vertical axis relative to the frame, said axle support having forward and rearward extending ends; first bearing means mounted on said axle support adjacent one of said ends, the axis of rotation about said first bearing means being oblique to the roadway; a bearing block rotatably mounted on said first bearing means, said bearing block having a crank arm displaced radially from the axis of rotation thereof; an axle assembly rotatably mounted on said bearing block, the plane of rotation of said axle assembly intersecting the plane of rotation of said bearing block; a control linkage coupling said crank arm to the frame for rotating said bearing block on said first bearing means when said axle support is pivoted relative to the frame; and second bearing means mounted on said axle support adjacent the other of said ends for positioning said other end above the roadway.

3. In a steerable axle arrangement for a vehicle movable along a roadway, the combination of: an axle support pivotally mounted on the frame of the vehicle, said axle support having forward and rearward extending ends; first bearing means mounted on said axle support adjacent one of said ends, the axis of rotation about said first bearing means being oblique to the roadway; a bearing block rotatably mounted on said first bearing means; an axle assembly rotatably mounted on said bearing block, the plane of rotation of said bearing block intersecting the plane of rotation of said axle assembly; means for rotating said bearing block relative to said axle support; and second bearing means mounted on said axle support adjacent the other of said ends for positioning said other end above the roadway.

4. In a steerable axle assembly for a vehicle movable along a roadway, the combination of: an axle support bar mounted on the frame of the vehicle, said support bar being pivoted relative to said frame about a substantially vertical axis, said support bar having ends extending forward and rearward of said vertical axis, one of said ends carrying a shaft positioned oblique to the roadway; a bearing block rotatably mounted on said shaft; a first axle assembly rotatably mounted on said bearing block, the plane of rotation of said first axle assembly intersecting the plane of rotation of said bearing block; a telescoping link coupling said bearing block to the frame for rotating said bearing block on said shaft, said telescoping link being pivotal in a vertical plane relative to said frame, said telescoping link being pivotally connected to a point on said bearing block radially displaced from the axis of rotation of said bearing block; and a second axle assembly mounted on said support bar adjacent the other of said ends thereof.

5. In a steerable axle assembly for a vehicle movable along a roadway, the combination of: an axle support bar mounted on the frame of the vehicle, said support bar being pivoted relative to said frame about a substantially vertical axis, said support bar having ends extending forward and rearward of said vertical axis, one of said ends carrying a shaft positioned oblique to the roadway, the other of said ends carrying a shaft positioned parallel with the roadway; a bearing block rotatably mounted on said oblique shaft; a first axle assembly rotatably mounted on said bearing block, said first axle assembly being rotatable in a substantially vertical plane; a telescoping link coupling said bearing block to the frame for rotating said bearing block on said oblique shaft, said telescoping link being pivotal in a vertical plane relative to the frame, said telescoping link being pivotally connected to a point on said bearing block radially displaced from the axis of rotation of said bearing block; and a second axle assembly rotatably mounted on said parallel shaft.

6. In a steerable axle assembly for a vehicle movable along a roadway, the combination of: an axle support bar having forward and rearward extending ends; first bearing means mounted on said axle support bar adjacent one of said ends, the axis of rotation about said first bearing means being oblique to the roadway; an axle assembly rotatably mounted on said first bearing means; second bearing means mounted on said axle support bar adjacent the other of said ends for positioning said other end above the roadway; and a cross joint coupling said axle support bar to the frame of the vehicle.

7. In a steerable axle arrangement for a vehicle movable along a roadway, the combination of: a first pivot pin mounted on the frame of the vehicle, said first pivot pin being rotatable about a horizontal axis perpendicular to the longitudinal axis of the vehicle; a second pivot pin mounted on said first pivot pin, said second pivot pin lying in a plane perpendicular to the roadway and parallel to said longitudinal axis of the vehicle, the axis of said second pivot pin intersecting the axis of rotation of said first pivot pin; an axle support bar carried by said second pivot pin, said axle support bar being rotatable about said axis of said second pivot pin, said axle support bar having forward and rearward extending ends; first bearing means mounted on said axle support bar adjacent one of said ends, the axis of rotation about said first bearing means being oblique to the roadway; an axle assembly rotatably mounted on said bearing means; and second bearing means mounted on said axle support bar adjacent the other of said ends for positioning said other end above the roadway.

8. In a steerable axle arrangement for a vehicle movable along a roadway, the combination of: a first pivot pin mounted on the frame of the vehicle, said first pivot pin being rotatable about a horizontal axis perpendicular to the longitudinal axis of the vehicle; a second pivot pin mounted on said first pivot pin, said second pivot pin lying in a plane perpendicular to the roadway and parallel to said longitudinal axis of the vehicle, the axis of said second pivot pin intersecting the axis of rotation of said first pivot pin; an axle support bar carried by said second pivot pin, said axle support bar being rotatable about said axis of said second pivot pin, said axle support bar having ends extending forward and rearward of said pivot pins, one of said ends carrying a shaft positioned oblique to the roadway, the other of said ends carrying a shaft positioned parallel to the roadway; a first axle assembly rotatably mounted on said oblique shaft; and a second axle assembly rotatably mounted on said parallel shaft.

9. In a steerable axle assembly for a vehicle movable along a roadway, the combination of: an axle support bar having forward and rearward extending ends; first bearing means mounted on said axle support bar adjacent one of said ends, the axis of rotation about said first bearing means being oblique to the roadway; an axle assembly rotatably mounted on said first bearing means; second bearing means mounted on said axle support bar adjacent the other of said ends for positioning said other end above the roadway; and a pivot coupling said axle support bar to the frame of the vehicle for rotation of said axle support bar relative to the frame about an axis oblique to the roadway.

References Cited in the file of this patent

UNITED STATES PATENTS

| | | |
|---|---|---|
| 1,936,954 | Robin | Nov. 28, 1933 |
| 2,764,425 | Ronning | Sept. 25, 1956 |